Patented Dec. 18, 1951

2,579,412

UNITED STATES PATENT OFFICE 2,579,412

REACTION OF VINYL ETHERS WITH HYDROXY COMPOUNDS

Robert L. Adelman, Niagara Falls, N. Y., assignor to E. I. du Pont de Nemours and Company, Wilmington, Del., a corporation of Delaware No Drawing. Application March 2, 1950, Serial No. 147,333

8 Claims. (Cl. 260—614)

This invention relates to the production of vinyl ethers and more particularly to the conversion of vinyl ethers to other vinyl ethers by reaction with organic hydroxy compounds.

Vinyl ethers may be prepared by reacting halogen-substituted olefins with hydroxy compounds (Ernst and Berndt, Ger. Patent 513,679 (1927)) or by dehydrohalogenating a halogen-substituted ether by means of a base (Horney and Skukys, U. S. P. 2,414,201 (1947); Botteron, U. S. P. 2,462,602 (1949)). Other methods include splitting alcohol from an acetal by pyrolysis in the presence of strong mineral acid (Schildkneckt, Zoss, and McKinley, Ind. Eng. Chem. 39, 180–186 (1947); Bramwyche and Mugdan, U. S. P. 2,482,725 (1949)), by reaction of an acetal with $P_2O_5$ in quinoline (Claisen, Ber. 31, 1019 (1898)), by reacting sodium with a chloroacetal, (Wislicenus, Ann. 192, 106 (1878)), or by reaction of alcohols with acetylene (U. S. P. 2,191,053 (1940); Plauson, U. S. P. 1,436,288 (1923); Plauson and Vielle, Brit. Patent 156, 117 (1920); Brit. Patent 231,841 (1924)).

The most widely known method is the reaction of acetylene with alcohols or phenols at high temperatures in the liquid or vapor phase, using a strongly alkaline medium (Reppe, Brit. Patent 369,297 (1932)). Strongly alkaline conditions are not necessary, if a zinc or cadmium salt, preferredly as a complex with a tertiary heterocyclic base, is employed as catalyst at high temperatures (150–180° C.) and under acetylene at 10–20 atmospheres pressure (Reppe and Wolff, U. S. P. 2,017,355; U. S. P. 2,157,347; U. S. P. 2,157,348). At atmospheric pressure higher alcohols are successfully vinylated and alkaline catalyst is necessary (U. S. P. 2,021,869). With the use of an aromatic amine as solvent, with strong alkali (sodium alkoxide) as catalyst, alcohols generally react with acetylene at atmospheric pressure to form vinyl ethers. (Evans, U. S. P. 2,404,700.)

Schildkneckt (Ind. Eng. Chem. 39, 180–186 (1947)) states that "the action of acetylene upon alcohols in the presence of mercuric salts or acidic catalysts give primarily acetals, and good yields of vinyl alkyl ethers are not obtained." It is also apparent that no satisfactory low temperature method of preparing vinyl ethers, either under acid or basic conditions has heretofore been available, except for the method disclosed in my copending application Serial No. 139,793, filed January 20, 1950.

An object of the present invention is an improved process for the production of vinyl ethers. Another object is a process for the production of vinyl ethers utilizing reaction of low temperatures and neutral to mildly acidic conditions. Another object is to provide a method for producing vinyl ethers which cannot be produced, or can be produced only with difficulty, by conventional methods heretofore known. Still other objects will be apparent from the following description of my invention.

The above stated objects may be attained in accordance with the present invention by reacting a vinyl ether with an organic hydroxy compound in liquid phase at a temperature not higher than −10° C. in the presence of a catalyst comprising a mercuric salt of a strong inorganic acid.

Previous reactions of vinyl ethers with alcohols have led to acetal formation (Hill, J. A. C. S. 50, 2727, (1928); Plauson, U. S. P. 1,436,288 (1923)) in the presence of strong acids as catalysts. The reaction of vinyl ethers with phenol produces the acetals in good yields (Levas, Compt. Rend. 228, 100–2 (1949)). I have discovered that whereas in the presence of acidic catalysts or mercury catalysts, vinyl ethers generally react with hydroxy compounds to form acetals, at low temperatures not exceeding about −10° C. acetal formation may be greatly suppressed and the vinyl ether and hydroxy compound react to form the vinyl ether of the hydroxy compound and the hydroxy compound corresponding to the vinyl ether reactant. The reaction which is generally, but not always, reversible proceeds according to the following equation:

$$CH_2=CHOR + R'OH \rightleftarrows CH_2=CHOR' + ROH$$

where R and R' represent organic radicals.

The invention is illustrated by the following examples.

Example 1

200 g. (2 moles) vinyl butyl ether (B. P. 92°/750 mm., $n_D^{21}=1.3995$), 23 g. (0.5 mole) absolute ethanol ($n_D^{21}=1.3602$), 0.4 g. (0.2%) mercuric acetate, and 3 drops of conc. sulfuric acid were added in the above order to a flask with agitation at −20° C. After 2½ hours at this temperature, 10 g. sodium carbonate were stirred into the reaction solution and the mixture was then distilled. 15 g. (44%) of vinyl ethyl ether were obtained (B. P. 35°–36°), 82 g. (41%) recovered vinyl butyl ether, and 106 g. (approx. 55%) of mixture of ethyl butyl and dibutyl acetals were formed. An increased ratio of vinyl ether to acetal formation can be obtained at lower reaction temperatures.

Example 2

102 g. (1 mole) of tetrahydrofurfuryl alcohol, 288 g. (4 moles) of vinyl ethyl ether, 3 g. (0.8%) mercuric acetate, and 8 drops sulfuric acid were added in above order with stirring to a reaction flask and kept at −20° to −25° C. for 3½ hours. The catalyst was neutralized with 5 g. of sodium carbonate and the solution distilled under reduced pressure. 10 g. (8%) of the vinyl ether of tetrahydrofurfuryl alcohol were obtained. (B. P. 45°/20 mm., highly unsaturated to neutral aqueous 1% $KMnO_4$ and $Br_2$ in $CCl_4$, and polymerized to a glass-like resin in 0.01% $BF_3$ etherate in ether at 60° C.) Also, 62 g. (60%) of the tetrahydrofurfuryl alcohol were recovered and 46 g. (26%) of tetrahydrofurfuryl ethyl acetal (B. P. 112–115° C./2 mm., $n_D^{21}$=1.4578) were also obtained.

Example 3

120 g. (2 moles) of ethylene glycol, 576 g. (6 moles) vinyl ethyl ether, 4 g. mercuric acetate, and 10 drops (0.15 g.) sulfuric acid were added in the above order with stirring to a reaction flask at −20° C. A two-phase liquid system resulted, which was stirred vigorously at −20° C. for 4 hours. Although the two-phase system still continued, 5 g. of sodium carbonate was added and the mixture distilled under reduced pressure. After removal of the vinyl ethyl ether, a distillate was collected largely consisting of monovinyl ether of ethylene glycol B. P. 60°–70°/22 mm. $n_D^{21}$=1.455 insoluble in carbon tetrachloride, highly unsaturated to bromine in carbon tetrachloride, with resulting solubility in that solvent.

The reaction may be carried out by merely mixing the vinyl ether and hydroxy compound, cooling the mixture to the desired reaction temperature (which must not exceed −10° C.) and adding the catalyst. If desired, the reactants may be cooled to the reaction temperature before mixing. In any case, it is essential that both reactants be in the liquid state at the temperature of reaction. If the reactants or a mixture thereof are solid at the reaction temperature, suitable solvents must be added to place them in solution and thereby bring them into the liquid state. Preferably, the reaction mixture initially should be a single liquid phase containing both reactants in the liquid state. However, the reaction may be carried out with the two reactants in two separate, immiscible liquid phases, in which case it is necessary to rapidly and thoroughly stir the reactants during the course of the reaction.

Solvents which are suitable for the reaction are any materials which are substantially chemically inert to the reactants and which will exist as liquids at the reaction temperature. Examples of solvents which are suitable for many combinations of vinyl ethers and hydroxy compounds are low molecular weight hydrocarbons such as propane, butane, heptane, cyclopropane, cyclopentane, propylenes, butylenes, diethyl ether, methylchloride, methylbromide and the like. If desired, pressure may be applied to maintain in the liquid state a solvent such as propane which otherwise would boil at the reaction temperature.

If possible, it is preferable to avoid the use of a solvent and the best results are obtained in those cases where the vinyl ether and hydroxy compound dissolve in one another to form a homogeneous liquid at the reaction temperature.

The reaction temperature may vary over a wide range provided it does not rise higher than −10° C. In most cases the optimum reaction temperature will lie in the range of −10 to −100° C. but still lower temperatures may be used in some cases. The speed of reaction varies with the temperature, being greater at the higher temperatures. However, higher temperature also favors the simultaneous formation of acetals, particularly at temperatures above −20° C. If a sufficiently low temperature is utilized, acetal formation may be almost completely suppressed, depending upon the vinyl ether and hydroxy compound reacted. In most cases, the optimum temperature is a "compromise" temperature at which the acetal formation is relatively small while the velocity of the desired reaction is relatively high. The optimum reaction temperature generally will lie in the range: −65 to −30° C.

The reaction is preferably carried out under anhydrous conditions, but small amounts of water, e. g., up to about 0.1% by weight can be tolerated. The presence of water, however, increases undesired by-product formation.

The proportions of the reactants mixed together will depend primarily upon the results desired. In most cases where the products of reaction as well as the reactants are liquid at the reaction temperature, the reaction results in an equilibrium mixture containing both vinyl ethers and both hydroxy compounds. In some cases, such equilibrium mixture is a desirable end product of the process. In other cases where it is desired to convert one vinyl ether into another and to obtain the latter in good yield, I prefer to add one of the two reactants in excess so as to force the reaction to the right as far as possible. The reaction products may be separated from the reaction mixture by conventional methods such as fractional distillation, fractional crystallization or the like.

The time required to carry out the reaction will vary considerably depending upon the particular reactants selected, catalyst concentration and reaction temperature. The reaction time is slower for reacting a vinyl ether with a dihydric hydroxy compound than with a monohydric hydroxy compound. The trihydric hydroxy compounds react still more slowly. Generally, the reaction time will vary, for example, from as little as 15 minutes to as long as 6 hours at a reaction temperature of −30° C.

The vinyl ethers which may be reacted in accordance with the present invention are those which have the formula: $CH_2=CHOR$ where R is any organic radical other than vinyl which contains not more than about 50 carbon atoms and has a carbon atom attached to the ether oxygen atom. The radical R in the above formula may be an unsubstituted hydrocarbon, as alkyl or phenyl, or it may contain various functional groups such as unsaturated carbon-carbon bonds, hydroxyl, ketone, acetal, ether, ester, carboxyl, halogen, amide or nitrile group.

Examples of vinyl ethers suitable as reactants in practicing my invention are vinyl ethyl ether, vinyl butyl ether, vinyl isobutyl ether, vinyl phenyl ether, the divinyl ether of ethylene glycol, the vinyl ether of ethylene glycol monoethyl ether, the vinyl ether of diethylene glycol mono-methyl ether and the like.

Organic hydroxy compounds suitable for use as reactants in practicing my invention are those which have not more than three hydroxyl groups and not more than about 50 carbon atoms in each molecule. As stated above, the hydroxy compounds having two or three hydroxyl groups react considerably slower than those containing only one hydroxy group, usually due to insolubility of the hydroxy compound in the vinyl ether. Thus a dihydroxy compound such as ethylene glycol in which the hydroxy groups are on adjacent carbon atoms, and which is insoluble in vinyl ethyl ether reacts much more slowly than a dihydroxy compound in which the hydroxyl groups are separated by two or more carbon atoms such as 1,5 pentanediol, which is considerably more soluble in vinyl ethyl ether. Hydroxy compounds containing five or six hydroxy groups on adjacent carbon atoms (e. g., glucose) are substantially insoluble, and unreactive with the vinyl ethers under the conditions described herein above. While the hydroxy compounds containing four or more hydroxyl groups spaced sufficiently far apart in the molecule may react under the herein described conditions with the vinyl ether, such polyhydroxy compounds generally react very slowly and I prefer, therefore, to utilize as reactant hydroxy compounds containing not more than three hydroxyl groups in the molecule.

The hydroxy compounds suitable for practicing the present invention are of the type R—OH, where R is an aliphatic, aromatic, or heterocyclic group, a carbon atom of which is attached to the hydroxyl oxygen. The hydroxy compound also may contain other functional groups, such as unsaturated carbon-carbon bonds, hydroxyl, ketone, acetal, ether, ester, carboxyl, halogen, amide, or nitrile and the like. Examples include methanol, ethanol, isopropyl alcohol, tertiary butyl alcohol, lauryl alcohol, allyl alcohol, crotonyl alcohol, tetrahydrofurfuryl alcohol, ethylene glycol, 1,5-pentanediol, glycerol, ethylene glycol monomethyl ether, diethylene glycol monomethyl ether, diacetone alcohol, glycolic aldehyde, ethylene glycol monoacetate, glycerol diacetate, glycolic acid, methyl glycolate, hydroxy trimethyl acetic acid, hydroxy acetamide, hydroxy acetonitrile, acetone cyanohydrin, amino methylols, ethylene cyanohydrin, pentamethylene cyanohydrin, ethylene chlorohydrin, and pentamethylene chlorohydrin, polymethylene glycols, polyethylene glycols, phenol, cresol, toluol, picric acid, resorcinol, resorcinol monomethyl ether, salicyclic acid, naphthols, aminonaphthols and the like.

The catalyst used is a mercuric salt of a strong acid, such as mercuric sulfate, mercuric phosphate, or mercuric·oxide boron trifluoride complex. By "strong acid" I mean one whose acid strength is not weaker than that of phosphoric acid. If mercuric sulfate is used, it is preferred to prepare the mercuric sulfate in situ (as for example, from mercuric acetate or oxide and sulfuric acid), as the catalyst so prepared dissolves more readily in the reaction medium and is considerably more reactive than the preformed catalyst. An excess of free, strong acid is not desirable, however, as this causes an increase in by-product formation by the addition of hydroxyl groups to the vinyl ether, and also may result in polymerization.

Inhibitors such as hydroquinone or copper resinate may be added in conventional proportions, if desired and do not interfere with the reaction.

The catalyst concentration may be varied from 0.05 to 10% by weight in the reaction mixture depending upon the reactivity of the vinyl ether and hydroxy compound employed. Generally, 0.5 to about 5% by weight of catalyst is satisfactory. Usually, the larger and more complex the molecules of the reacting reactants, the larger amount of catalyst is required to obtain maximum speed of reaction.

The present invention provides a new and improved method for making vinyl ethers many of which cannot be prepared, or can be prepared only with difficulty and in poor yields, by using conventional methods which employ alkaline conditions or high temperatures. The reaction according to my invention, occurring at low temperature and under neutral to only mildly acidic conditions provides a means for producing vinyl ethers which are unstable under alkaline conditions or at higher temperatures. Examples of such vinyl ethers are:

Vinyl ether of 3 chloro 1-propanol

$$CH_2=CH-O-CH_2CH_2CH_2Cl$$

Vinyl ether of hydroxy acetic acid

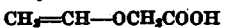
$$CH_2=CH-OCH_2COOH$$

Vinyl ether of hydroxy acetic acid methyl ester

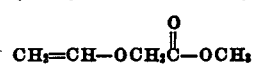
$$CH_2=CH-OCH_2\overset{O}{\overset{\|}{C}}-OCH_3$$

Vinyl ether of acetoin

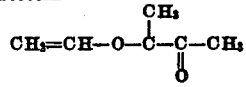
$$CH_2=CH-O-\overset{CH_3}{\underset{\underset{O}{\|}}{C}}-C-CH_3$$

Vinyl ether of hydroxyvaleraldehyde

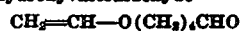
$$CH_2=CH-O(CH_2)_4CHO$$

Vinyl ether of beta-hydroxy acrylonitrile

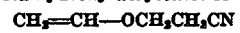
$$CH_2=CH-OCH_2CH_2CN$$

Vinyl ethers of high boiling unsaturated alcohols.

To produce such a vinyl ether, I prefer to react the corresponding alcohol with a vinyl ether which can readily be prepared by reacting an alcohol with acetylene by conventional methods, e. g. vinyl ethers having the formula:

$$CH_2=CHOR$$

where R is an alkyl group having not more than four carbon atoms, i. e., vinyl methyl ether, vinyl ethyl ether, vinyl propyl ethers and vinyl butyl ethers.

Vinyl ethers which may be made by the present invention, have value in the manufacture of vinyl resins, solvent drying oils and as intermediates for further organic syntheses. Such ethers include ethers of the following alcohols; halogenated alcohols, keto alcohols and alcohols containing carboxyl, ester, nitrile, unsaturated groups or heterocyclic groups.

I claim:
1. The process which comprises reacting at a temperature not higher than −10° C. in the presence of a mercuric salt of a strong mineral acid a vinyl ether having the formula

$$CH_2=CH-O-R$$

where R is an organic radical other than vinyl having not more than 50 carbon atoms and having a carbon atom attached to the ether oxygen, with an organic hydroxy compound having from 1 to 3 hydroxyl groups selected from the group consisting of alcoholic and phenolic hydroxyl groups and having not more than 50 carbon atoms, said 1 to 3 hydroxyl groups being attached to a radical different than the radical R of said vinyl ether, said vinyl ether and said hydroxy compound being in the liquid state at the reaction temperature.

2. The process of claim 1, wherein said vinyl ether and said hydroxy compound are soluble, one in another, to form a homogeneous liquid at the reaction temperature.

3. The process of claim 1, wherein said vinyl ether and said hydroxy compound are dissolved in a mutual solvent, forming a homogeneous liquid solution at the reaction temperature.

4. The process which comprises reacting at a temperature not higher than −10° C. in the presence of a mercuric salt of a strong mineral acid a vinyl alkyl ether having not more than four carbon atoms in the alkyl group with an organic hydroxy compound having from 1 to 3 hydroxyl groups selected from the group consisting of alcoholic and phenolic hydroxyl groups and having not more than 50 carbon atoms, said 1 to 3 hydroxyl groups being attached to a radical different than the alkyl radical of said vinyl ether, said vinyl ether and said hydroxyl compound being in the liquid state at the reaction temperature.

5. The process of claim 4, wherein the hydroxy compound is furfuryl alcohol.

6. The process of claim 4, wherein the hydroxy compound is the monomethyl ether of ethylene glycol.

7. The process of claim 4, wherein the vinyl ether is vinyl ethyl ether and the hydroxy compound is n-butyl alcohol.

8. The process of claim 4, wherein the hydroxy compound has the formula ROH, where R is an alkyl radical different than the alkyl radical of said vinyl alkyl ether.

ROBERT L. ADELMAN.

REFERENCES CITED

The following references are of record in the file of this patent:

UNITED STATES PATENTS

| Number | Name | Date |
| --- | --- | --- |
| 1,436,288 | Plauson | Nov. 21, 1922 |